(12) United States Patent
Komatsu et al.

(10) Patent No.: US 7,068,158 B2
(45) Date of Patent: Jun. 27, 2006

(54) TIRE PRESSURE MONITORING SYSTEM

(75) Inventors: Goro Komatsu, Saitama (JP); Makoto Bessho, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 23 days.

(21) Appl. No.: 10/736,715

(22) Filed: Dec. 16, 2003

(65) Prior Publication Data

US 2004/0123654 A1 Jul. 1, 2004

(30) Foreign Application Priority Data

Dec. 17, 2002 (JP) ............................. 2002-365556

(51) Int. Cl.
 *B60C 23/02* (2006.01)
(52) U.S. Cl. .................. 340/445; 340/442; 200/61.25; 73/146.4
(58) Field of Classification Search ................ 340/442, 340/445, 447; 73/146–146.5, 146.8, 714; 200/61.22, 61.25
See application file for complete search history.

(56) References Cited

U.S. PATENT DOCUMENTS

| | | | |
|---|---|---|---|
| 3,461,423 A * | 8/1969 | Trumble | 340/436 |
| 4,263,579 A * | 4/1981 | Corgan et al. | 340/447 |
| 4,697,450 A * | 10/1987 | Bachman et al. | 73/23.2 |
| 5,463,374 A * | 10/1995 | Mendez et al. | 340/442 |
| 6,011,463 A * | 1/2000 | Cormier, Sr. | 340/447 |
| 6,476,712 B1 * | 11/2002 | Achterholt | 340/447 |
| 6,612,165 B1 * | 9/2003 | Juzswik et al. | 73/146.5 |
| 2003/0046993 A1 * | 3/2003 | Fujii | 73/146.5 |
| 2003/0214395 A1 * | 11/2003 | Flowerday et al. | 340/445 |
| 2004/0095231 A1 * | 5/2004 | Ichinose | 340/442 |

FOREIGN PATENT DOCUMENTS

| | | |
|---|---|---|
| JP | 43-17766 | 7/1968 |
| JP | 06-092114 | 4/1994 |
| JP | 2000-142043 | 5/2000 |
| JP | 2001191768 A * | 7/2001 |

OTHER PUBLICATIONS

KO Tenzai, JP-2001191768-A (machine translation).*

* cited by examiner

*Primary Examiner*—Jeffery Hofsass
*Assistant Examiner*—Anne V. Lai
(74) *Attorney, Agent, or Firm*—Carrier, Blackman & Associates, P.C.; Joseph P. Carrier; William D. Blackman (57) ABSTRACT

A tire pressure monitoring system having a monitoring unit that receives the output of a transmitted pressure sensor through a receiving antenna, and compares the output with a predetermined value to determine whether the tire pressure is proper, and informs a result of the determination to an operator by an indicator or alarm section connected to an onboard battery through an ignition switch. In the system, an operating switch is installed in a vehicle compartment to be operable by the operator for supplying the operating power to the indicator by connecting it to the battery, while bypassing the ignition switch. Alternatively, a portable terminal device to be carried by the operator is connected to the monitoring unit in such a manner that the monitoring unit transmits the result of the determination to the portable terminal device to inform the result of the determination to the operator by a second indicator provided at the portable terminal device. With this, the operator's work is facilitated when pumping up the tire with insufficient pressure.

16 Claims, 9 Drawing Sheets

TRANSMITTED DATA: | ID PULSE TRAIN + PRESSURE PULSE TRAIN + TEMPERATURE PULSE TRAIN + VOLTAGE PULSE TRAIN |

ID PULSE TRAIN:   FR |||||||||||||||||||||||||

TIRE PRESSURE MONITORING SYSTEM

BACKGROUND OF THE INVENTION

1. Field of the Invention

This invention relates to a tire pressure monitoring system.

2. Description of the Related Art

An automobile (vehicle) operator conducting a pre-driving inspection can easily check the engine oil and coolant levels visually from the exterior but has no easy way to ascertain from the exterior whether the pressure of the tires is appropriate.

For overcoming this inconvenience, Japanese Laid-open Patent Publication No. Sho 43(1963)-17766 teaches a tire pressure monitoring system in which a pressure-actuated switch and a sensor unit comprising a small oscillator equipped with a transmitting antenna and other components is attached to each tire, the oscillator is operated to transmit an output when the tire pressure falls to or below a predetermined value, and the transmitted output is received by a receiving antenna-equipped monitoring unit installed near the operator's seat.

Moreover, well-known methods for detecting tire pressure include, in addition to the above, the method taught by Japanese Laid-open Patent Publication No. 2000-142043 of directly detecting tire pressure using a pressure sensor and the method taught by Japanese Laid-open Patent Publication No. Hei 6(1994)-92114 of estimating tire pressure from the output of an ABS (Antilock Brake System) wheel speed sensor.

When low tire pressure is ascertained by the foregoing conventional techniques, a warning to this effect is displayed on an indicator or the like provided on the dashboard near the operator's seat. The operator can then get out of the vehicle and inflate the tire whose pressure has become low. At this time, however, in order to reconfirm which tire requires more air before actually pumping air into the tire, the operator needs to turn on the ignition switch again so as to redisplay the information on the indicator.

SUMMARY OF THE INVENTION

An object of this invention is therefore to overcome the foregoing problem by providing a tire pressure monitoring system that facilitates the operator's work when pumping up a tire with insufficient pressure.

For achieving this object, the invention in a first one of its aspects provides a tire pressure monitoring system comprising: a sensor unit installed at each of the tires and including at least a pressure sensor that produces an output representing air pressure of the tire and a transmitting antenna that transmits the output of the pressure sensor; a monitoring unit having a receiving antenna and an alarm section, the monitoring unit receiving the output transmitted by the pressure sensor through the receiving antenna, comparing the output with a predetermined value to determine whether the tire pressure is proper, and informing a result of the determination to an operator by the alarm section; a battery mounted on the vehicle and connected to the alarm section through an ignition switch to supply operating power to the alarm section; and an operating switch installed in a compartment of the vehicle to be operable by the operator for supplying the operating power to the alarm section by connecting the battery to the alarm section, while bypassing the ignition switch.

For also achieving this object, the invention in a second one of its aspects provides a system for monitoring pressure of tires mounted on a vehicle, comprising: a sensor unit installed at each of the tires and including at least a pressure sensor that produces an output representing air pressure of the tire and a first transmitting antenna that transmits the output of the pressure sensor; a monitoring unit having a first receiving antenna, a second transmitting antenna and a first alarm section, the monitoring unit receiving the transmitted output of the pressure sensor through the first receiving antenna, comparing the output with a predetermined value to determine whether the tire pressure is proper, and informing a result of the determination to an operator by the first alarm section; and a portable terminal device to be carried by the operator when the operator is outside the vehicle and having a second receiving antenna installed at the portable terminal device and a second alarm section; wherein the monitoring unit transmits the result of the determination to the portable terminal device through the second transmitting antenna and the second receiving antenna to inform the result of the determination to the operator by the second alarm section.

BRIEF DESCRIPTION OF THE DRAWINGS

The above and other objects and advantages of the invention will be more apparent from the following description and drawings, in which.

DETAILED DESCRIPTION OF THE PREFERRED EMBODIMENTS

Preferred embodiments of the invention will now be explained with reference to the drawings.

Figure 1:
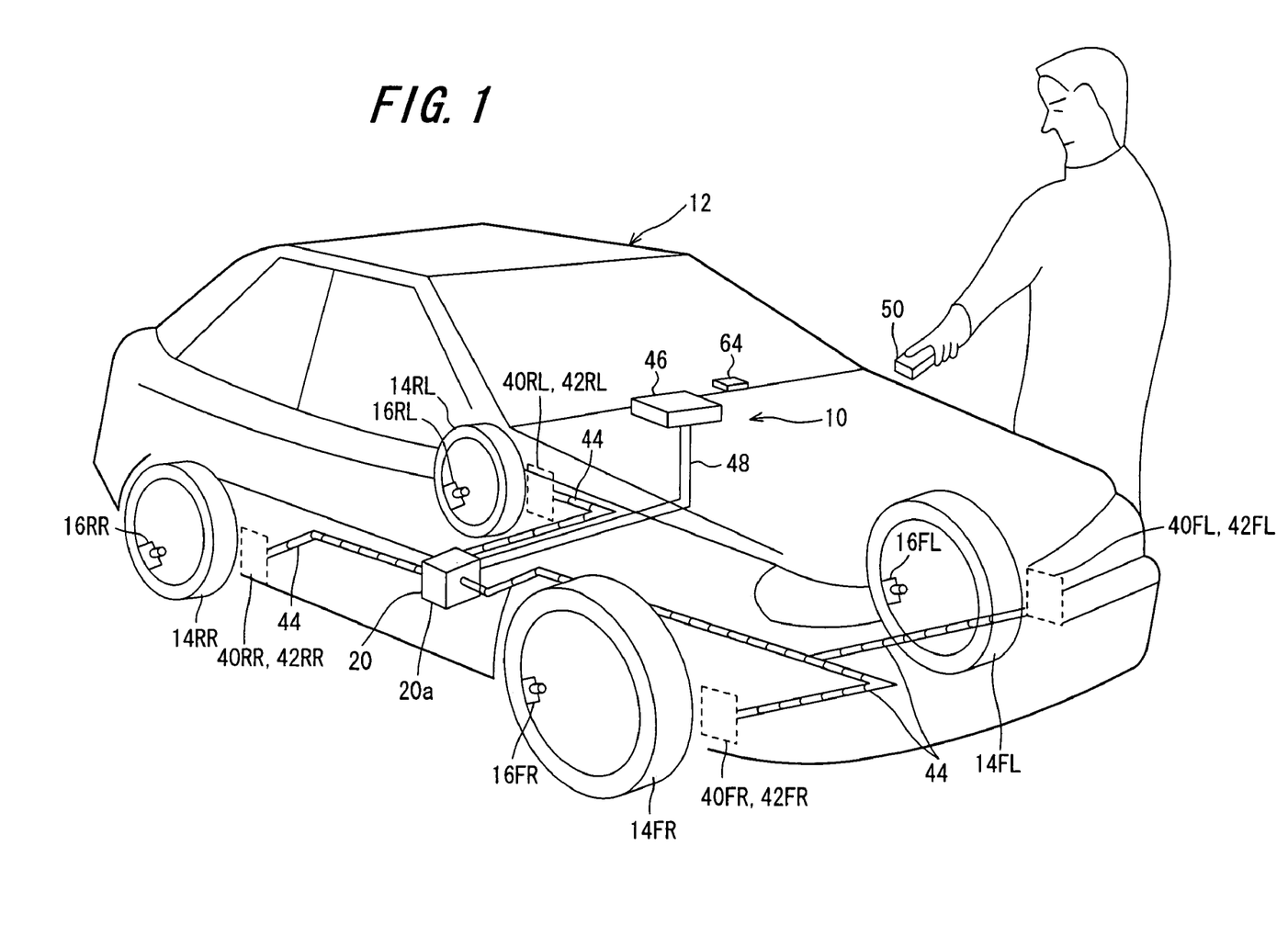
FIG. 1 is a schematic explanatory diagram showing an overall view of a tire pressure monitoring system in accordance with an embodiment of the invention.

FIG. 1 is a schematic explanatory diagram showing an overall view of a tire pressure monitoring system in accordance with an embodiment of the invention.

Reference numeral 10 designates the tire pressure monitoring system. The tire pressure monitoring system 10 is equipped with four sensor units, collectively designated by reference numeral 16, installed one at each of four tires (a plurality of tires), collectively designated by reference numeral 14, mounted on a vehicle 12, and a single monitoring unit 20 installed at an appropriate location in the passenger compartment of the vehicle 12. As illustrated, the four tires 14 and associated sensor units 16 are individually designated 14FR and 16FR (at the front right (FR)), 14RR and 16RR (at the rear right (RR)), 14FL and 16FL (at the front left (FL)), and 14RL and 16RL (at the rear left (RL)).

Figure 2:
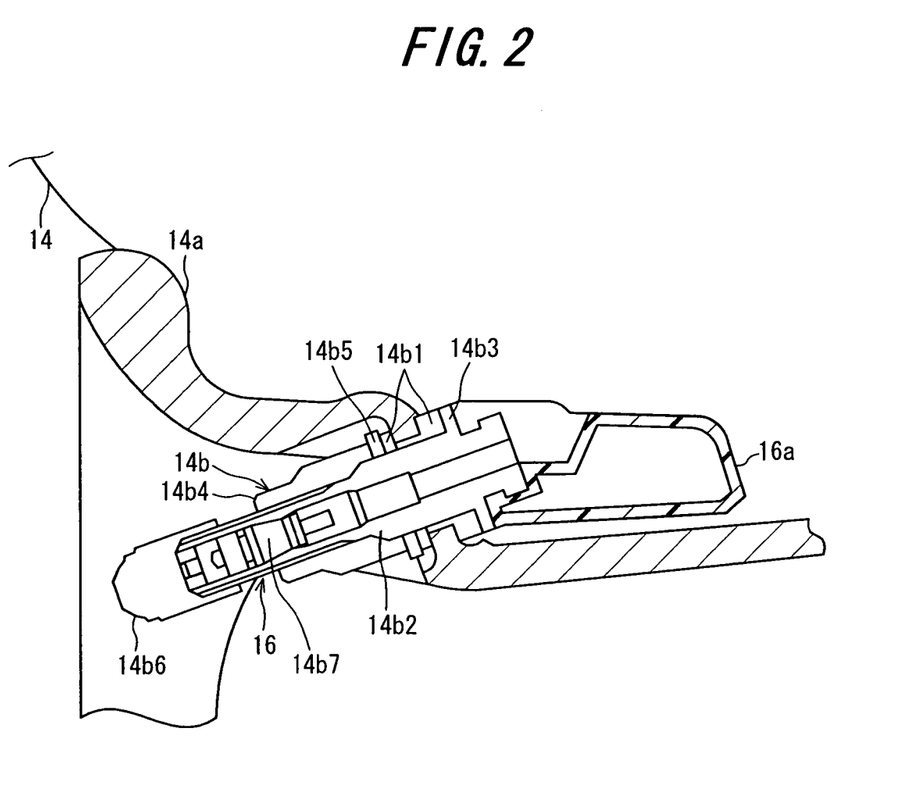
FIG. 2 is an explanatory sectional view showing the structure of a sensor unit illustrated in FIG. 1.

FIG. 2 is an explanatory sectional view showing the structure of a sensor unit 16.

As illustrated, the sensor unit 16 is structured integrally with an inflation valve 14b mounted on a metal wheel disk (rim) 14a. Grommets (bushes) 14b1 are interposed between the wheel disk 14a and the valve 14b. The valve 14b is fixed in the illustrated position by pinching the grommets 14b1 between a flange portion 14b3 formed to project from the outer periphery of a stem 14b2 of the valve 14b and a nut 14b4 (and washer 14b5). The valve 14b is enlarged on the inner side of the wheel disk 14a and the main body 16a of a sensor unit 16 is connected to the enlarged portion. The reference symbols 14b6 and 14b7 designate a cap and a valve core used for pumping air (inflation), respectively.

Figure 3:
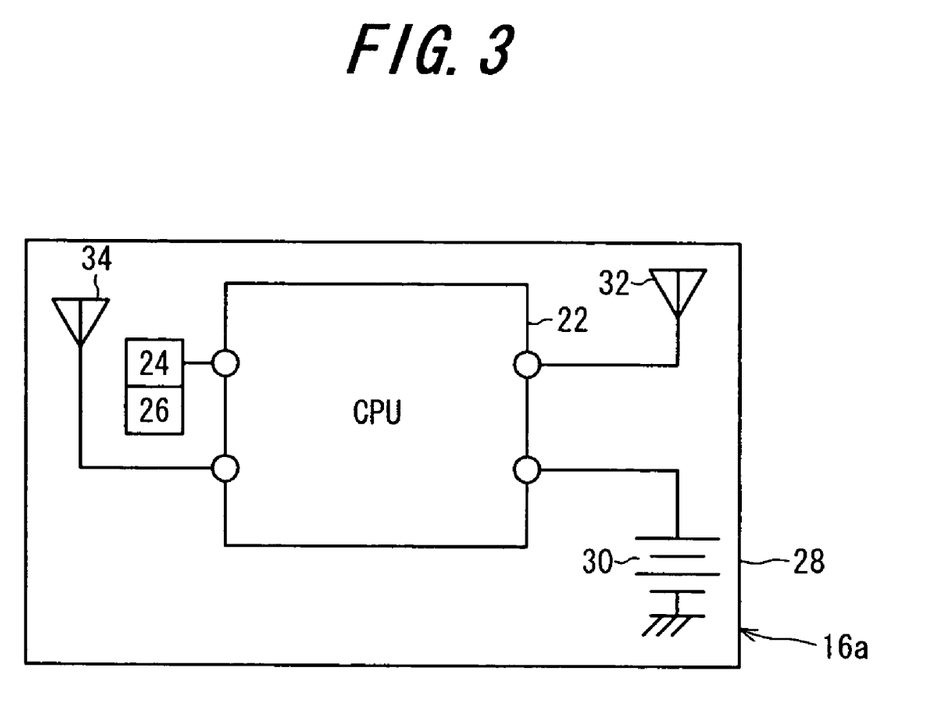
FIG. 3 is a block diagram showing the structure of a main body of the sensor unit illustrated in FIG. 1 in detail.

FIG. 3 is a block diagram showing the structure of the main body 16a of the sensor unit 16 in detail.

The main body 16a of the sensor unit 16 is equipped with a CPU (central processing unit) 22, a pressure sensor (air pressure sensor) 24 that produces an output representing the air pressure inside the wheel disk 14a, i.e., the tire pressure (air pressure), and a temperature sensor 26 that produces an output representing the temperature at its location (tire internal temperature). The outputs of the sensors 24 and 26 are sent through an A/D converter circuit (not shown) and input to the CPU 22 as digital values. The CPU 22, pressure sensor 24 and other components are mounted integrally on a single circuit-board 28 in a one-chip structure.

A battery (e.g., lithium battery) 30 mounted on the main body 16a serves as the operating power source for the CPU 22. The main body 16a is further provided with a transmitting antenna 32 and a receiving antenna 34 for transmitting the outputs of the pressure sensor 24 and temperature sensor 26 to the monitoring unit and receiving transmissions from the monitoring unit 20

Although omitted from FIG. 3, a voltage sensor is provided at a suitable part of the power circuit between the battery 30 and CPU 22 and outputs a signal proportional to the output voltage of the battery 30. The output of the voltage sensor is also input to the CPU 22 after A/D conversion.

The explanation will be continued with reference to FIG. 1. The monitoring unit 20 is equipped with a main unit 20b (not shown in FIG. 1) housed in a housing 20a mounted at an appropriate location in the passenger compartment, four receiving antennas collectively designated by reference numeral 40 and four transmitting antennas collectively designated by reference numeral 42. One receiving antenna and one transmitting antenna are accommodated in each of four housings mounted near the respective tires 14. In other words, the monitoring unit 20 is equipped receiving antennas 40FR to 40RL and transmitting antennas 42FR to 42RL mounted in association with the tires 14FR to 14RL. The receiving antennas 40 and transmitting antennas 42 are connected to the main unit 20b in the housing 20a by coaxial cables 44.

The monitoring unit 20 is further equipped with an indicator (alarm section) 46 installed in the dashboard near the operator's seat of the vehicle 12. The indicator 46 and the main unit 20b in the housing 20a of the monitoring unit 20 are connected via a harness 48.

Reference numeral 50 designates a portable terminal device that, as illustrated, is carried by the operator when outside the vehicle 12. It can be a remote keyless entry device, such as a cellular phone (portable phone), but is preferably a remote keyless entry device having a built-in antenna for transmitting door lock and unlock signals to the vehicle 12. The portable terminal device is not limited to the foregoing devices, however, and can be any of various other terminal devices that can be carried by the operator when outside the vehicle 12.

Figure 4:
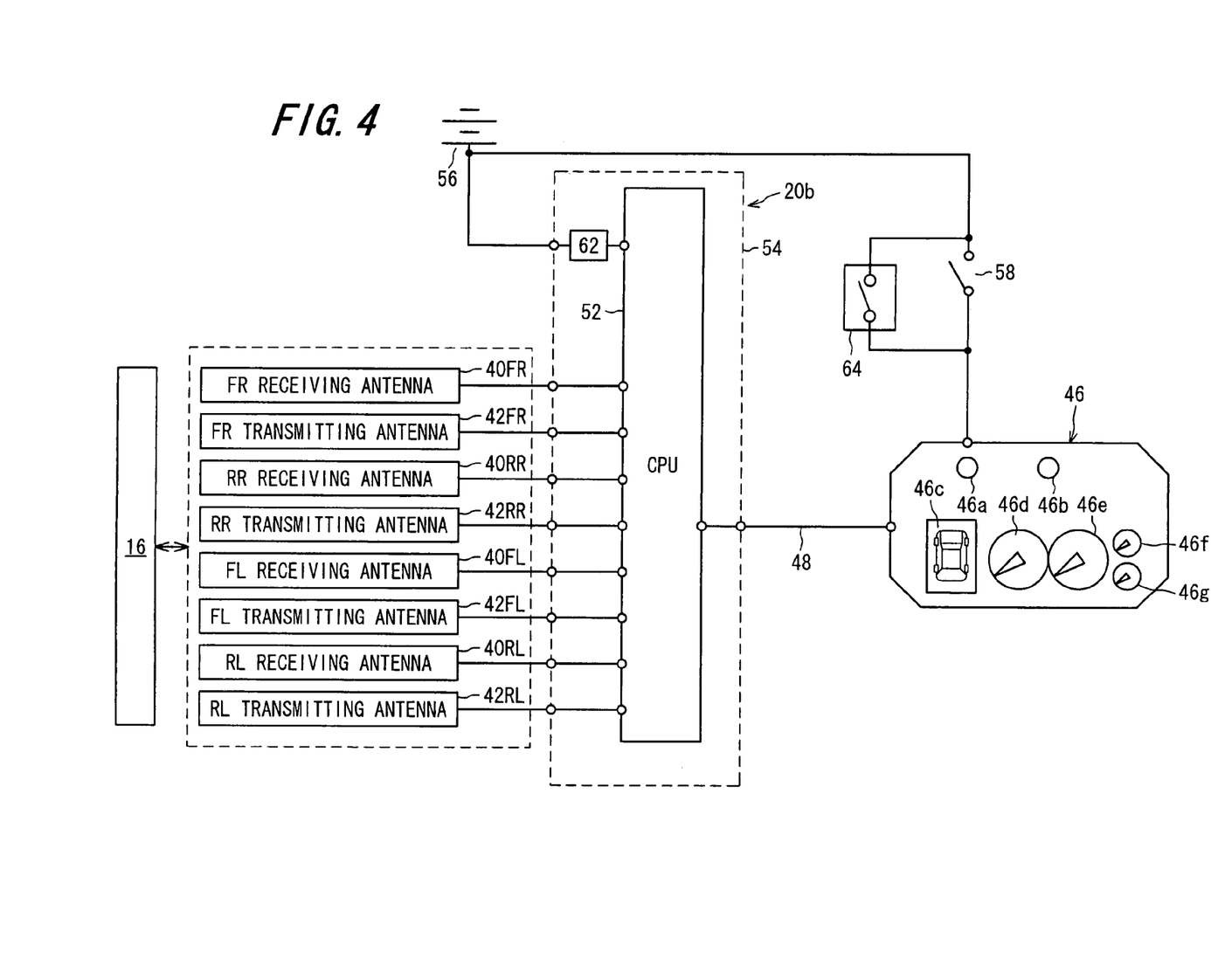
FIG. 4 is an explanatory block diagram showing the structure of a main unit and the like in a monitoring unit illustrated in FIG. 1 in detail.

FIG. 4 is an explanatory block diagram showing the structure of the main unit 20b and the like in the monitoring unit 20 in detail.

As illustrated, the main unit 20b of the monitoring unit 20 is equipped with a CPU 52. Like the main body 16a of the sensor unit 16, the CPU 52 is also mounted on a single circuit board (designated by reference numeral 54 in FIG. 4) in a one-chip structure. The CPU 52 receives data from the sensor units 16 via the receiving antennas 40 and, as explained later, transmits data from the transmitting antennas 42.

The indicator 46 is equipped with first and second warning lamps 46a, 46b and five display panels 46c, 46d, 46e, 46f, 46g. As mentioned above, the indicator 46 is connected to the main unit 20b, more specifically, to the CPU 52 thereof.

Figure 5:
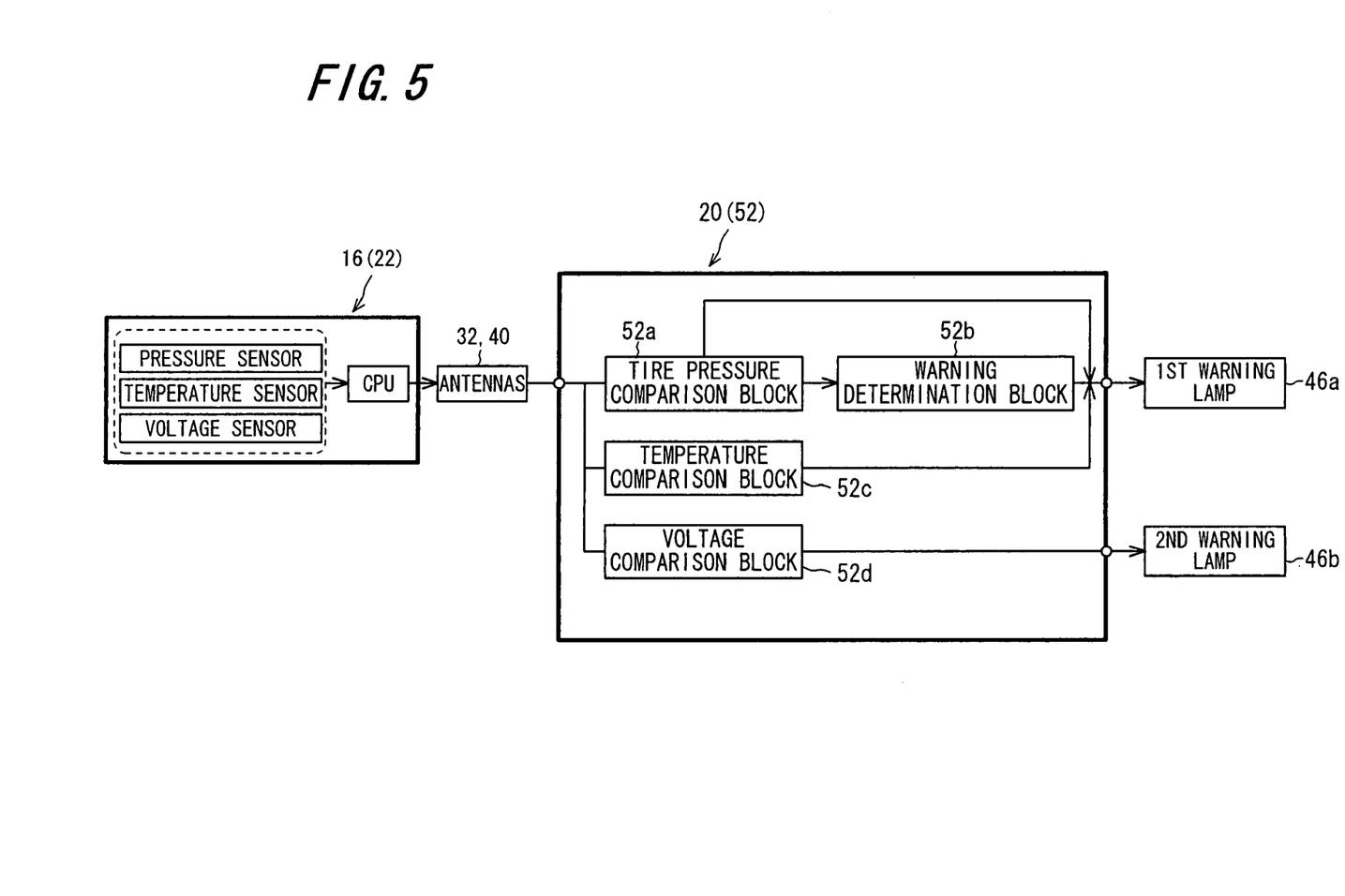
FIG. 5 is an explanatory block diagram functionally illustrating the operation of the monitoring unit, more exactly, the operation of a CPU that constitutes the monitoring unit.

FIG. 5 is an explanatory block diagram functionally illustrating the operation of the monitoring unit 20, more exactly, the CPU 52 of its main unit 20b.

The signals representing the pressures of the four tires 14 transmitted from the sensor units 16 through the transmitting antennas 42 are input to the CPO 52 through the receiving antennas 40 and the input values are compared with a first predetermined value in a pressure comparison block 52a. The first predetermined value is a value obtained by multiplying RCP by 1.3 (where RCP is the Recommended Cold Pressure: the proper tire pressure value for the type of the vehicle after the vehicle has stood long enough for the tire to completely cool).

When the pressure comparison block 52a finds that the input values associated with one or more of the four tires are equal to or higher than the first predetermined value, the CPU 52 determines that the pressure of the tire(s) concerned is excessive, outputs an illuminate instruction signal (alarm instruction signal) to the indicator 46 to light the first warning lamp 46a, and outputs a transmission period change signal (explained later) to the sensor unit(s) 16 via the antennas 42 and 34.

When the first warning lamp 46a is lit by the output of a light-up instruction signal from the CPU 52, the image of each tire concerned among the four tires is accentuated in the vehicle diagram shown in the display panel 46c. However, the invention is not limited to the use of the visual alarm indicator 46 for the alarm means as explained in the foregoing and it is alternately possible to use an audible alarm such as a speaker or buzzer, either alone or in combination with visual alarm means.

When the pressure comparison block 52a finds that the input values (detected tire pressures) are all lower than the first predetermined value, the CPO 52 causes the input values to be compared with a second predetermined value in a warning determination block 52b. The second predetermined value is a value obtained by multiplying RCP by 0.8.

When the warning determination block 52b finds that the input values are lower than the second predetermined value, the CPU 52 outputs an illuminate instruction signal to light the first warning lamp 46a and outputs a transmission period change signal to the sensor unit(s) 16 via the antennas 42 and 34.

On the other hand, when the CPU 52 finds that the input values are equal to or higher than the second predetermined value, it outputs an extinguish instruction signal to turn off the first warning lamp 46a. The CPU 52 also operates in this manner when the pressure comparison block 52a finds that the input values are lower than the first predetermined value.

The outputs from the temperature sensors 26 representing temperatures inside the wheel disks 14a for the four tires 14, i.e., the tire temperatures, transmitted from the sensor units 16 through the transmitting antennas 32 are input to the CPU 52 through the receiving antennas 40 and the input values are compared with a predetermined temperature (e.g., 80° C.) in a temperature comparison block 52c.

When the temperature comparison block 52c finds that the input values associated with one or more of the four tires are equal to or higher than the predetermined temperature, the CPU 52 outputs an illuminate instruction signal to light the first warning lamp 46a, and when the temperature comparison block 52c finds that all of the input values are lower than the predetermined temperature, the CPU 52 outputs an extinguish signal to turn off the first warning lamp 46a.

The signals representing the output voltages of the batteries 30 output by the voltage sensors and transmitted from the sensor units 16 through the transmitting antennas 32 are input to the CPU 52 through the receiving antennas 40 and the input values are compared with a predetermined voltage (e.g., 1.8 V) in a voltage comparison block 52d.

When the voltage comparison block 52d finds that one or more of the input values is lower than the predetermined voltage, the CPU 52 outputs an illuminate instruction signal to light the second warning lamp 46b, and when the voltage comparison block 52d finds that all of the input values are equal to or higher than the predetermined voltage, the CPU 52 outputs an extinguish signal to turn off the second warning lamp 46b.

The operating power supply will be explained.

As shown in FIG. 4, the indicator 46 of the monitoring unit 20 is connected to an onboard battery 56 of the vehicle 12 through an ignition switch 58 so as to be supplied with operating power for operation (display) when the operator turns on the ignition switch 58.

Differently from this, the CPU 52 of the monitoring unit 20 is continuously connected to the onboard battery 56 through a constant power source circuit 62. As explained earlier, the sensor units 16 are powered by lithium batteries 30. The sensor units 16 therefore detect (measure) the tire pressure etc., and produce/transmit corresponding outputs even when the ignition switch 58 is OFF, i.e., when the engine (not shown) of the vehicle 12 is stopped, while the monitoring unit 20 also constantly receives these transmissions and determines whether the tire pressures are normal in the manner explained later.

The power circuit between the onboard battery 56 and the indicator 46 includes an operating switch 64 connected in parallel with the ignition switch 58. So as to be operable by the operator, the switch 64 is mounted in the passenger compartment of the vehicle 12 at a location next to the indicator 46 installed in the dashboard at the operator's seat. When the operating switch 64 is turned on by the operator, the onboard battery 56 is connected to the indicator 46 to supply operating power to the indicator 46 while bypassing the ignition switch 58. As will be understood, the operating switch 64 permits power to be supplied to the alarm section regardless of the operating condition of the vehicle.

Figure 6A:
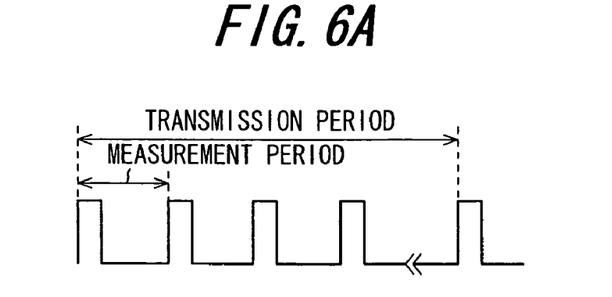
FIGS. 6A and 6B are a set of time charts showing the tire pressure and other detection/transmission operations of the sensor unit illustrated in FIG. 2.
Figure 6B:
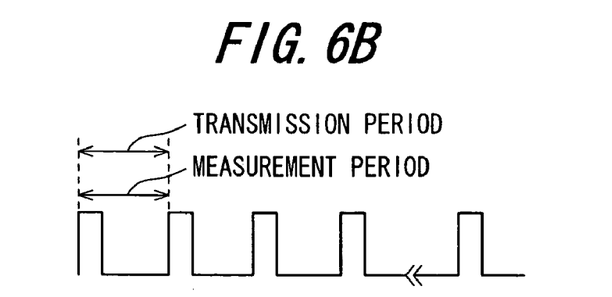

FIGS. 6A and 6B are a set of time charts showing the tire pressure and other detection/transmission operations of the CPU 52.

FIG. 6A is a time chart of the operation when the tire pressure is normal, i.e., when at least the tire pressures are lower than the first predetermined value and equal to or higher than the second predetermined value. It should be noted, however, that the tire temperature being lower than the predetermined temperature can made a condition for deeming the tire pressure to be abnormal, in addition to the condition of normal tire pressure.

When the tire pressure is normal, the CPUs 22 of the sensor units 16 are input with (read) the A/D-converted sensor outputs once every predetermined measurement period (7.0 sec, for example) and transmit the input values (detected values) to the monitoring unit 20 once every transmission period (between 4.0 min and 8.0 min, for example). The transmission periods of the four sensor units 16 are slightly staggered.

The transmission of data from the transmitting antennas 32 of the sensor units 16 to the monitoring unit 20 through the receiving antennas 40 is conducted at a frequency of 315 MHz. The transmission of data from the transmitting antennas 42 of the monitoring unit 20 to the receiving antennas 34 of the sensor units 16, explained later, is conducted at the same frequency.

Figure 7:
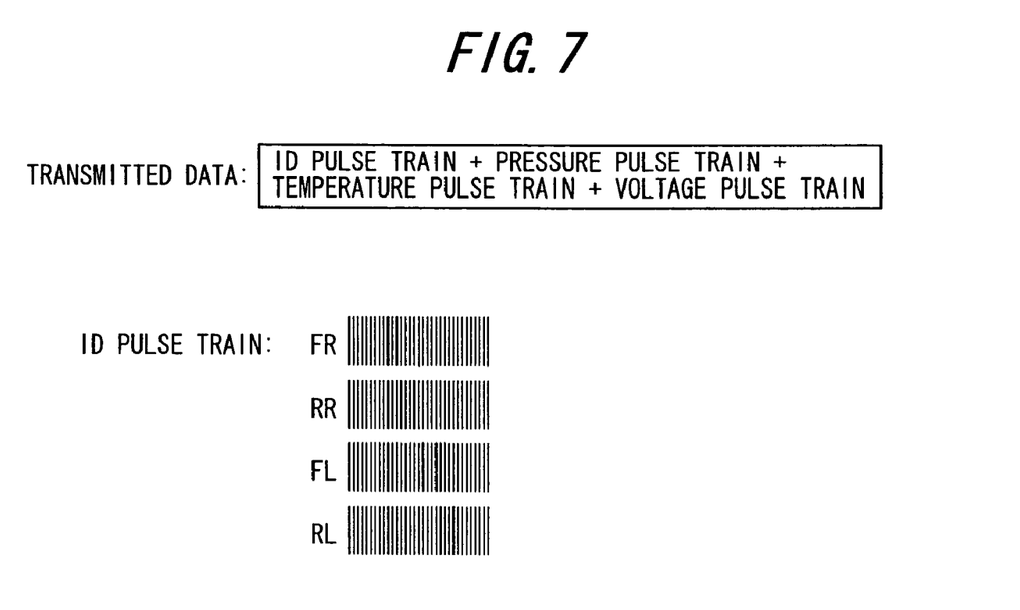
FIG. 7 is an explanatory view showing the structure of the data transmitted from the sensor units illustrated in FIG. 2.

As shown in FIG. 7, the data are transmitted from the sensor units 16 in unit signals of, for example, 56 bits composed by combining an ID pulse train (explained later) with other pulse trains representing the pressure sensor output (digitized), temperature sensor output (digitized), and voltage sensor output (digitized), where the ID pulse train comprises 32 bits and the pulse trains representing the outputs of the pressure sensor, temperature sensor and voltage sensor consist of 8 bits each.

As shown at the bottom of FIG. 7, the ID pulse train comprises barcodes assigned to the individual members of a set of four tires 14 associated one each with the four sensor units 16. Specifically, a different set of barcodes is assigned to the four tires (14FL . . . ) of each vehicle 12 when it is shipped from the factory, so that every vehicle 12 has its own unique set of barcodes. Thus, each barcode (ID pulse train) specifies one tire of the set of tires of a particular vehicle.

When the CPU 52 of the monitoring unit 20 determines that the input value (detected tire pressure) for one of the four tires 14 is equal to or higher than the first predetermined value or lower than the second predetermined value, it lights the appropriate one of the warning lamps (the warning lamp 46a, for example) of the indicator 46 and sends the sensor unit 16 concerned a transmission period change signal via the associated transmitting antenna 42 and receiving antenna 34. The CPU 52 attaches the ID pulse train for the tire 14 concerned to the transmitted signal. The CPU 22 of the one of the sensor units 16FR to 16RL specified by the ID pulse train therefore recognizes that the transmission period change signal is directed to it and changes the transmission period accordingly.

The purchaser of the vehicle 12 may later rotate the tires 14. Therefore, when four sets of data transmitted from the transmitting antennas 32 of the sensor units 16 are received by the CPU 52 of the monitoring unit 20 through the receiving antenna 40 of the monitoring unit 20, the CPU 52 determines that the most strongly received set of data (the one with the highest signal strength) among the four received sets of data is the data transmitted from the sensor unit 16 of the tire associated with the receiving antenna 40 concerned.

This will be explained more concretely taking the receiving antenna 40FR as an example. Suppose that, as shown in FIG. 1, the tire closest to the receiving antenna 40FR is 14FR. In this case, the set of data most strongly received by the receiving antenna 40FR among the sets of data transmitted for the four tires during respective transmission intervals is the set of data from the sensor unit 16FR. The CPU 52 therefore determines that the transmitted data from the sensor unit 16FR is information for the tire at the front right FR of the vehicle.

If the tires 14 are then rotated so that the one closest to the transmitting antenna 40FR becomes tire 14RL, meaning that the sensor unit closest to the receiving antenna 40FR becomes the sensor unit 16RL, the set of transmitted data most strongly received by the receiving antenna 40FR becomes that from the sensor unit 16RL. The CPU 52 therefore determines that the most strongly received set of data transmitted from the sensor unit 16RL is information for the front right tire of the vehicle and changes the ID pulse train stored in the CPU 52 for the right front tire of the vehicle from that for the sensor unit 16FR to that for the sensor unit 16RL.

The explanation will be continued with reference to FIG. 6B. FIG. 6B is a time chart for when a tire is abnormal, i.e., when the tire pressure is equal to or higher than the first predetermined value or lower than the second predetermined value.

As was explained earlier, the monitoring unit 20 outputs a transmission period change signal in this case. The associated sensor unit 16 therefore continues to A/D-convert and read the sensor outputs once every measurement period (e.g., 7.0 sec) and shortens the transmission period to 7.0 sec, for example, in response to the transmission period change signal.

This method is adopted in order to minimize drain on the battery 30 of the sensor unit 16, which has limited capacity, by making the transmission period long when the tire pressure etc., are normal and to increase the monitoring frequency to enable prompt issuance of warnings as is preferable when the tire pressure has been found not to be normal.

Having been described in the above, the first embodiment is arranged to have a tire pressure monitoring system comprising: a sensor unit 16 installed at each of the tires 14 mounted on a vehicle 12 and including at least a pressure sensor 24 that produces an output representing air pressure of the tire and a transmitting antenna 32 that transmits the output of the pressure sensor; a monitoring unit 20 having a receiving antenna 40 and an alarm section (the indicator 46, the warning lamp 46a, the display panel 46c), the monitoring unit receiving the output of the transmitted pressure sensor through the receiving antenna, comparing the output with a predetermined value to determine whether the tire pressure is proper, and informing a result of the determination to an operator by the alarm section; a battery 56 mounted on the vehicle and connected to the alarm section through an ignition switch 58 to supply operating power to the alarm section; and an operating switch 64 installed in a compartment of the vehicle to be operable by the operator for supplying the operating power to the alarm section by connecting the battery to the alarm section, while bypassing the ignition switch.

Thus, the tire pressure monitoring system is equipped with an operating switch installed in the passenger compartment of the vehicle to be operable by the operator for supplying operating power to the alarm section by connecting an onboard battery to the alarm section while bypassing the ignition switch. Therefore, at the time of getting out of the vehicle to pump air into a tire whose pressure has become low, the operator can readily carry out this work without turning on the ignition switch 58 because he or she can confirm which tire requires more air by bringing up the display on the indicator 46, which can be done simply by turning on the operating switch 64 in the passenger compartment without need to turn on the ignition switch.

In the system, alarm section includes a warning lamp 46a that is lit when the result of the determination indicates that the tire pressure is not proper. And the alarm section includes a display panel 46c that informs the result of the determination by coloration. As will be explained later, the monitoring unit informs the result of the determination to the operator with indication of increase/decrease direction of tire pressure adjustment by an arrow.

Moreover, the monitoring unit 20 is configured so that when outputting a transmission period change signal, it simultaneously attaches an ID pulse train specifying the tire 14 whose pressure was found to be improper to the transmitted data. This avoids implementation of the transmission period shortening in the sensor units 16 of all four tires and ensures that the transmission period is shortened only in the sensor unit 16 associated with the tire 14 whose pressure or the like was found to be improper.

Figure 8:
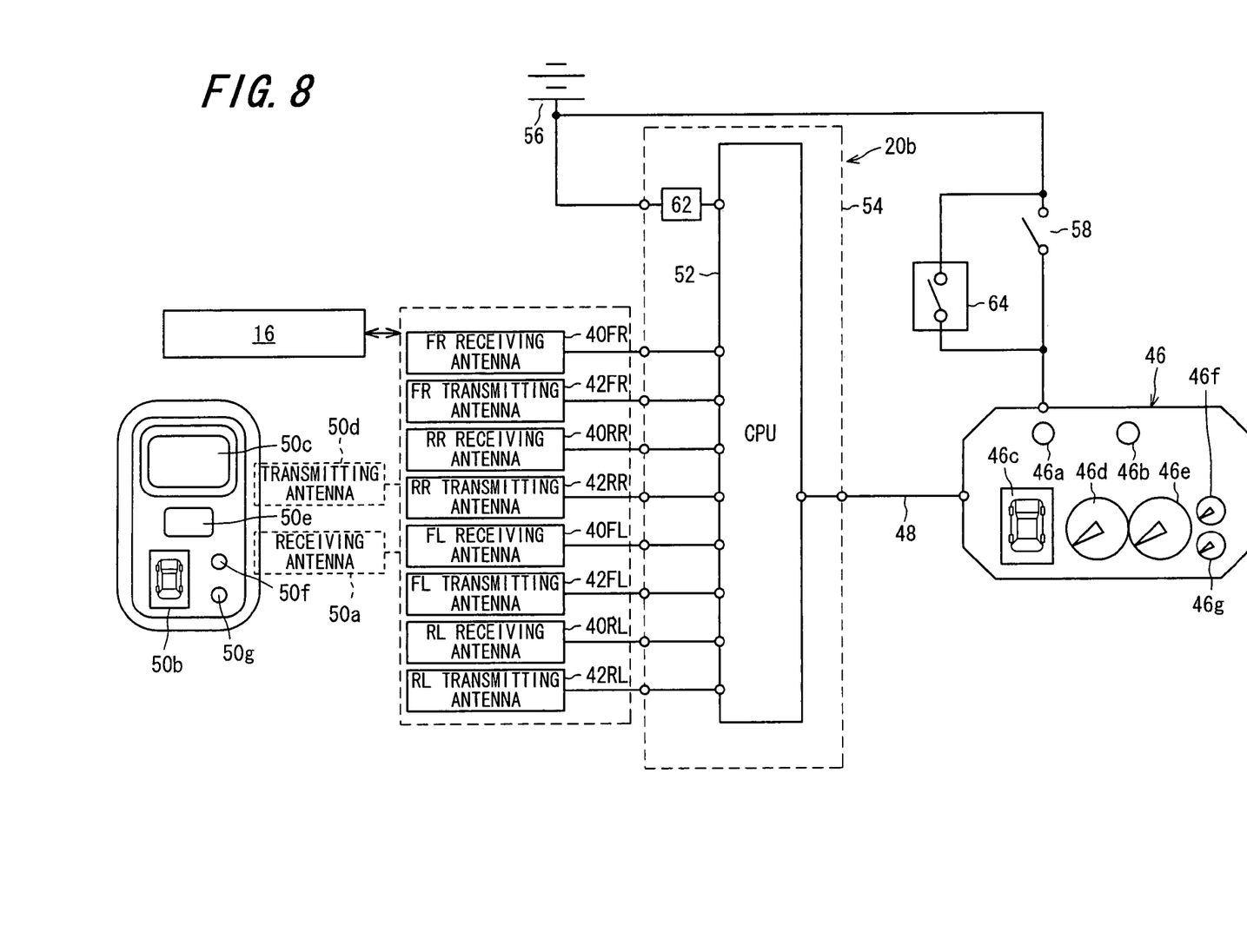
FIG. 8 is an explanatory block diagram, similar to FIG. 4, but showing the operation of a tire pressure monitoring system according to a second embodiment of the invention.

FIG. 8 is an explanatory block diagram similar to that of FIG. 4, but showing the operation of the tire pressure monitoring system according to a second embodiment of this invention.

The second embodiment will be explained with regard to the points of difference from the first embodiment. In the tire pressure monitoring system according to the second embodiment, the remote keyless entry device (portable terminal device) 50 is equipped with a third receiving antenna 50a and a second indicator (alarm section) 50b. This configuration enables the foregoing determinations to be displayed on the second indicator 50b through the transmitting antennas 42 and third receiving antenna 50a in accordance with the operator's instructions.

More specifically, the remote keyless entry device 50 is equipped with the third receiving antenna 50a and the second indicator 50b, as well as a second operating button 50e, in addition to the components it requires for its basic function, namely, a built-in operating button 50c and a transmitting antenna 50d for transmitting door lock and unlock signals to the vehicle 12 in response to operation of the operating button 50c. The second operating button 50e is for inputting operator instructions.

The remote keyless entry device 50 generally receives and transmits signals at the frequency of 315 MHz, which, as mentioned earlier, is also the frequency used for transmissions between the monitoring unit 20 and the sensor units 16. The addition of the third receiving antenna 50a therefore involves only minor circuit modification.

With the foregoing configuration, an operator instruction input by pressing the second operating button 50e is sent to the CPU 52 through the transmitting antenna 50d and receiving antennas 40. The CPU 52 then transmits the foregoing determination results through the transmitting antennas 42 and the third receiving antenna 50a for display on the second indicator 50b. Other aspects of the configuration are the same as those of the first embodiment.

The pattern displayed on the second indicator 50b is the same as that displayed on the display panel 46c of the indicator 46. Reference symbols 50f and 50g designate warning lamps similar to the first and second warning lamps 46a and 46b of the indicator 46.

Figure 9:
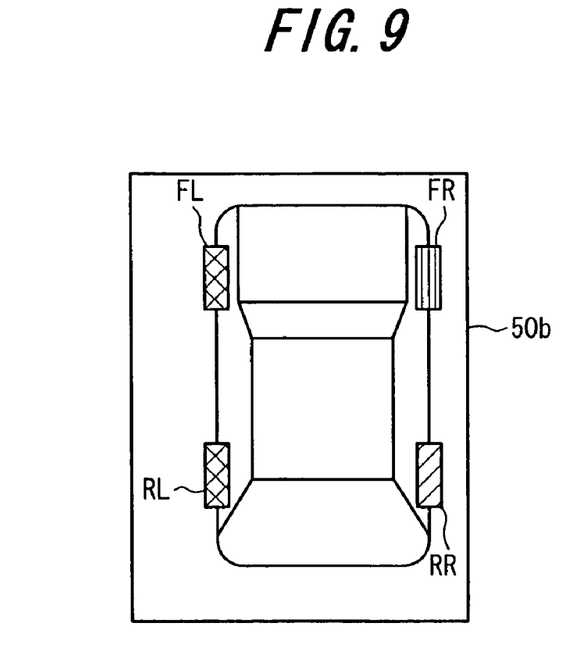
FIG. 9 is an explanatory view showing another example of the pattern displayed on the indicator including that used in the system according to the second embodiment.

The pattern displayed on the second indicator 50b (and the indicator 46 in the second embodiment) is not limited to that shown in FIG. 8 and it is possible instead to use a pattern like that shown in FIG. 9 to indicate the pressure condition of each tire separately.

In FIG. 9, the tires at the front left FL and rear left RL are crosshatched to indicate normal tire pressure, the tire at the front right FR is longitudinally hatched to indicate low tire pressure, and the tire at the rear right RR is diagonally hatched to indicate high tire pressure. In the actual display, the difference in hatching is accentuated by coloration. For example, normal tire pressure is indicated by blue, low tire pressure by yellow and high tire pressure by red.

Figure 10:
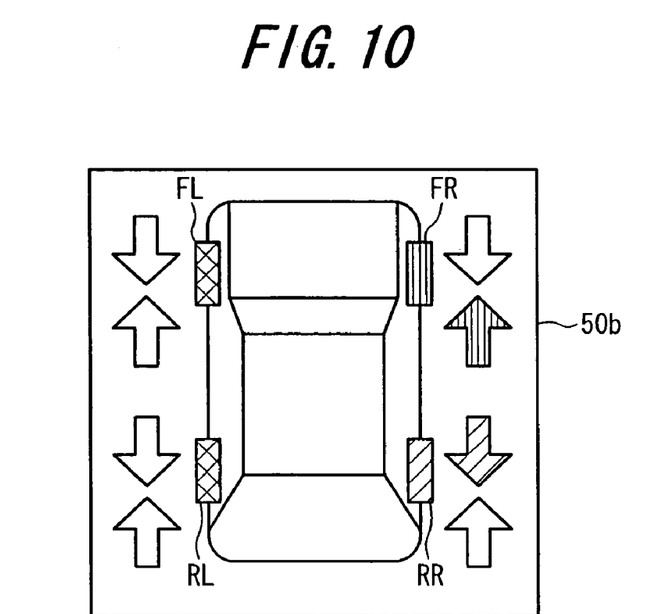
FIG. 10 is an explanatory view showing still another example of the pattern displayed on the indicator including that used in the system according to the second embodiment.

Another pattern that can be adopted is illustrated in FIG. 10. The display panel 50b shown in FIG. 10 not only indicates the pressure condition of the tires with hatching as explained above but also includes arrows indicating the direction of pressure adjustment (increase/decrease). The arrows of the tires at the front and rear left FL, RL are left blank because their states are "normal," the upward pointing arrow of the tire at the front right FR is given the same hatching as that for low pressure because its pressure is "insufficient," and the downward pointing arrow of the tire at the rear right RR is given the same hatching as that for high pressure because its pressure is "excessive."

Figure 11:
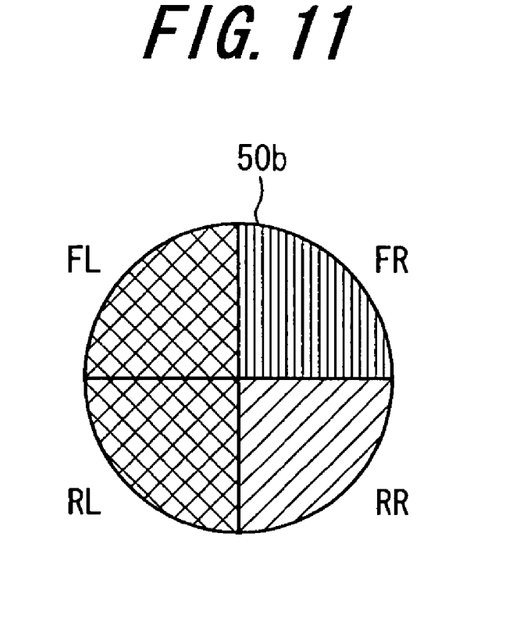
FIG. 11 is an explanatory view showing yet still another example of the pattern displayed on the indicator including that used in the system according to the second embodiment.
Figure 12:
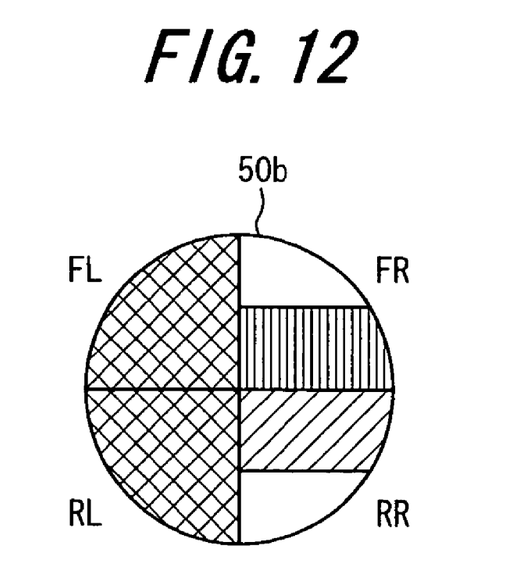
FIG. 12 is an explanatory view showing yet still another example of the pattern displayed on the indicator including that used in the system according to the second embodiment.

It is also possible to indicate the pressure condition of the individual tires using a circular graph-like pattern as shown in FIG. 11 or to indicate the adjustment direction as shown in FIG. 12. In FIG. 12, the tire at the upper right is given low-pressure hatching on the lower side because its pressure is insufficient, while the tire at the lower right is given high-pressure hatching because its pressure is excessive. Thus, hatching on the lower side indicates that tire pressure needs to be adjusted upward and hatching on the upper side indicates that tire pressure needs to be adjusted downward. The patterns shown FIGS. 11 and 12 have the advantage of taking up less space than those shown in FIGS. 9 and 10.

The second embodiment is thus arranged to have a system for monitoring pressure of tires mounted on a vehicle, comprising: a sensor unit 16 installed at each of the tires 14 mounted on a vehicle and including at least a pressure sensor 24 that produces an output representing air pressure of the tire and a first transmitting antenna 32 that transmits the output of the pressure sensor; a monitoring unit 20 having a first receiving antenna 40, a second transmitting antenna 42 and a first alarm section (the indicator 46, the warning lamp 46a, the display panel 46c), the monitoring unit 20 receiving the transmitted output of the pressure sensor through the first receiving antenna, comparing the output with a predetermined value to determine whether the tire pressure is proper, and informing a result of the determination to an operator by the first alarm section; and a portable terminal device (remote keyless entry device) 50 to be carried by the operator when the operator is outside the vehicle and having a second receiving antenna 50a and a second alarm section (the indicator 50b, the warning lamp 50f); wherein the monitoring unit transmits the result of the determination to the portable terminal device through the second transmitting antenna and the second receiving antenna to inform the result of the determination to the operator by the second alarm section.

Specifically, the portable terminal device 50 includes a third transmitting antenna 50d and a button (operating button) 50e; and wherein the monitoring unit transmits the result of the determination to the portable terminal device through the first transmitting antenna 42 and the second receiving antenna 50a to inform the result of the determination to the operator by the second alarm section, when an instruction is made by the operator through the button and is transmitted to the monitoring unit 20 through the third transmitting antenna 50d.

Thus, the tire pressure monitoring system is equipped with the second alarm section provided in a portable terminal device that the operator carries on his or her person when outside the vehicle and the monitoring unit operates in accordance with the operator's instructions to transmit determination results through the second transmitting antenna and the second receiving antenna for display on the second alarm section together with tire pressure condition information. Therefore, at the time of getting out of the vehicle to pump air into a tire whose pressure has become low, the operator can readily carry out this work without turning on the ignition switch, because the determination results can be displayed at the alarm section of the portable terminal device simply by an instruction of the operator. As a result, the operator can easily check the pressure of the tires 14 from the exterior, such as when making a pre-driving inspection.

Further, since the determination results are displayed at the alarm section of the portable terminal device so as to include tire pressure condition information, the work of properly adjusting tire pressure is facilitated because the operator can ascertain high and low tire pressure conditions from the display at the alarm section.

Furthermore, in the system, the second alarm section (indicator 50b) includes a warning lamp 50f that is lit when the result of the determination indicates that the tire pressure is not proper. The second alarm section includes a display panel (indicator 50b) that informs the result of determination by coloration.

The monitoring unit 20 informs the result of the determination to the operator with indication of increase/decrease direction of tire pressure adjustment by an arrow. Thus, the tire pressure monitoring system is configured so that when the determination results indicate that tire pressure is improper, the monitoring unit also displays the tire pressure adjustment direction, i.e., whether the tire concerned needs to be inflated or deflated, thus making the work of properly adjusting tire pressure even easier.

In the system, the portable terminal device is one from either a remote keyless entry device or a cellular phone (portable phone). The fact that the portable terminal device is constituted as the remote keyless entry device 50 or a cellular phone (portable phone) contributes further to ease the operator's work, because the operator is able to carry out the pressure adjustment with the portable terminal device, the remote keyless entry device 50, for example, within easy reach.

Moreover, the determination results are displayed on the second indicator 50b of the remote keyless entry device 50 together with the tire pressure condition, so that by using as predetermined values the first predetermined value representing a value on the excessive side and the second predetermined value representing a value on the insufficient side, the user can ascertain high and low tire pressure conditions from the display at the alarm section and take remedial action. The work of properly adjusting tire pressure is therefore further facilitated.

Further, the monitoring unit 20 is configured so that when the determination results indicate that the pressure of one or more of the four tires is improper, the tire pressure adjustment direction is displayed as shown in FIGS. 10 to 12. This display of the tire pressure adjustment direction, i.e., whether the tire needs to be inflated or deflated, further simplifies the work of properly adjusting tire pressure.

It should be noted in the above that, although the remote keyless entry device 50 is used as the portable terminal device in the foregoing embodiments, as pointed out earlier, it is possible to use a cellular phone (portable phone) instead. While use of the remote keyless entry device 50 is preferable because, as explained above, its transmission frequency is the same as the transmission frequency of the illustrated tire pressure monitoring system 10, it suffices to add an appropriate multiplier circuit or the like when the frequency of the portable terminal device differs from that of the tire pressure monitoring system, as in the case of a cellular phone (portable phone). At any rate, by using the portable terminal device, the operator can simply and rapidly check the pressure of the tires 14 from the exterior before boarding the vehicle, such as when making a pre-driving inspection.

It should also be noted in the above that the invention is not limited to the use of visual alarm indicators 46 and 50b as explained in the foregoing and it is alternately possible to use audible alarms, either alone or in combination with visual alarm means.

The entire disclosure of Japanese Patent Application No. 2002-365556 filed on Dec. 17, 2002, including specification, claims, drawings and summary, is incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A system for monitoring pressure of tires mounted on a vehicle, comprising:
  a sensor unit installed at each of the tires mounted on a vehicle and including at least a pressure sensor that produces an output representing air pressure of the tire and a transmitting antenna that transmits the output of the pressure sensor;
  a monitoring unit having a receiving antenna and an alarm section, the monitoring unit receiving the output transmitted by the pressure sensor through the receiving antenna, comparing the output with a predetermined value to determine whether the tire pressure is proper, and informing a result of the determination to an operator by the alarm section;
  a battery mounted on the vehicle and connected to the alarm section through an ignition switch to supply operating power to the alarm section; and
  an operating switch installed in a compartment of the vehicle to be operable by the operator for supplying the operating power to the alarm section regardless of the operating condition of the vehicle by connecting the battery to the alarm section, while bypassing the ignition switch.

2. A system according to claim 1, wherein the alarm section includes a warning lamp that is lit when the result of the determination indicates that the tire pressure is not proper.

3. A system according to claim 1, wherein the alarm section includes a display panel that informs the result of the determination by coloration.

4. A system according to claim 1, wherein the monitoring unit informs the result of the determination to the operator with indication of increase/decrease direction of tire pressure adjustment.

5. A system according to claim 4, wherein the alarm section includes a display panel that indicates the increase/decrease direction of tire pressure adjustment by an arrow.

6. A system according to claim 1, wherein the predetermined value is set based on a recommended cold pressure.

7. A system for monitoring pressure of fires mounted on a vehicle, comprising:
  sensor units installed at each of the tires mounted on a vehicle, respectively, and each sensor unit including at least a pressure sensor that produces an output representing air pressure of the tire and a first transmitting antenna that transmits the output of the pressure sensor,
  a monitoring unit having a first receiving antenna, a second transmitting antenna and a first alarm section, the monitoring unit receiving the transmitted output of the pressure sensor through the first receiving antenna, comparing the output with a predetermined value to determine whether the tire pressure is proper, and informing a result of the determination to an operator by the first alarm section; and
  a portable terminal device to be carried by the operator when the operator is outside the vehicle and having a second receiving antenna and a second alarm section;
  wherein the monitoring unit transmits the result of the determination to the portable terminal device through the second transmitting antenna and the second receiving antenna to inform the result of the determination to the operator by the second alarm section;
  wherein the monitoring unit informs the result of the determination to the operator with indication of increase/decrease direction of tire pressure adjustment; and
  wherein the second alarm section includes a display panel that indicates the increase/decrease direction of tire pressure adjustment by an arrow.

8. A system according to claim 7, wherein the portable terminal device includes a third transmitting antenna and a button; and wherein the monitoring unit transmits the result of the determination to the portable terminal device through the second transmitting antenna and the second receiving antenna to inform the result of the determination to the operator by the second alarm section, when an instruction is made by the operator through the button and is transmitted to the monitoring unit through the third transmitting antenna.

9. A system according to claim 7, wherein the second alarm section includes a warning lamp for each of the tires that is lit when the result of the determination indicates that corresponding said tire pressure is not proper.

10. A system according to claim 7, wherein the second alarm section includes a display panel that informs the result of determination by coloration.

11. A system according to claim 7, wherein the portable terminal device is one of a remote keyless entry device, a cellular phone and a portable phone.

12. A system according to claim 7, wherein a frequency of the antennas is set to a same value.

13. A system according to claim 7, wherein the predetermined value is set based on a recommended cold pressure.

14. A system according to claim 7, wherein said predetermined value corresponds to a recommended cold pressure value multiplied by a variable.

15. A system according to claim 7, wherein the variable is 1.3.

16. A system according to claim 7, wherein the second alarm section includes a display panel that informs the result of determination by at least one of coloration and hatching patterns.

* * * * *